Dec. 25, 1923.

C. E. SLYE 1,478,801

COOKING UTENSIL

Filed April 14, 1922   2 Sheets-Sheet 1

Witnesses:
W. T. Kilroy
Harry R. White

Inventor
Clarence E. Slye

By Murray Lotz & Wilson
Attys.

Dec. 25, 1923.  1,478,801
C. E. SLYE
COOKING UTENSIL
Filed April 14, 1922  2 Sheets-Sheet 2
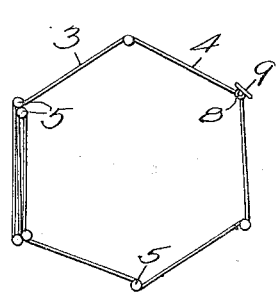
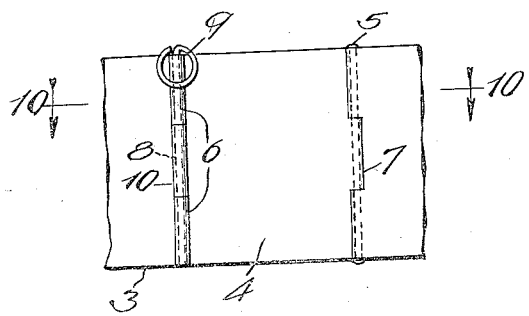
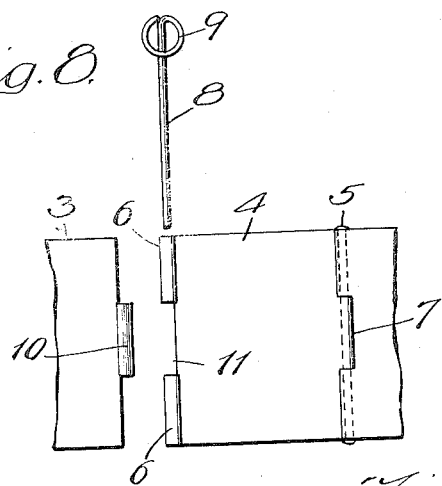
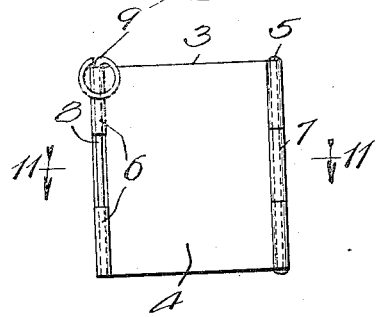
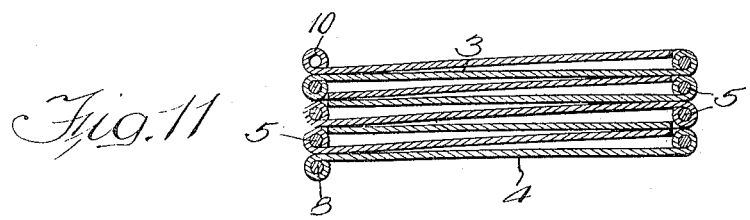
Witnesses:
W. F. Kilroy
Harry R. L. White
Inventor:
Clarence E. Slye
By Murray Lotz & Wilson
Attys.

Patented Dec. 25, 1923.

1,478,801

UNITED STATES PATENT OFFICE.

CLARENCE E. SLYE, OF AURORA, ILLINOIS.

COOKING UTENSIL.

Application filed April 14, 1922. Serial No. 552,811.

*To all whom it may concern:*

Be it known that I, CLARENCE E. SLYE, a citizen of the United States, and resident of Aurora, in the county of Kane and State of Illinois, have invented certain new and useful Improvements in a Cooking Utensil, of which the following is a specification.

My invention relates to improvements in cooking utensils and has special reference to a variable wall or enclosure for use particularly in a roasting pan.

The object of my invention is to provide a variable device of simple character for providing a space in the roasting pan which is substantially closed off from the main part of the pan. This enclosed space is for use in holding food materials together within a limited area and is of particular benefit in holding a quantity of dressing in a suitable space within a roasting pan and subject to the juices of the roast. Other specific uses might be the provision of a suitable space within a relatively large roasting pan for retaining materials during the roasting process for making a meat loaf. Many other uses will suggest themselves such as holding potatoes or other vegetables in a more or less compact body separated from the meat which is being roasted in the roasting pan but subject to the meat juices.

A particular object of my invention is to provide a variable wall for producing spaces or enclosed areas of various dimensions and shapes for enclosing various foods to be cooked in conjunction with meats in such relation that the enclosed foods will be subject to the juices of the meats during the roasting process. A further object is to provide a device of the kind described by which the horizontal dimensions and shapes of the enclosed space can be readily changed to suit various circumstances such as the quantity or shape of the food to be cooked and which device can readily be collapsed into a small compass when not in use.

My invention will be more readily understood by reference to the accompanying drawings forming part of this specification, and in which:—

Figure 6 is a view similar to the foregoing showing the device arranged to enclose a smaller space than the maximum;

Figure 7 is a fragmentary side view of the device showing one of the hinged panels, one end of which is removably connected to the adjacent panel;

Figure 8 is a view similar to Figure 7 showing the removable hinge pin withdrawn and the separable ends of the device spaced apart;

Figure 9 is a plan view of the device in collapsed or closely folded form;

Figure 10 is a horizontal sectional view on the line 10—10 of Figure 7; and

Figure 11 is a sectional view on the line 11—11 of Figure 9.

Figure 1:
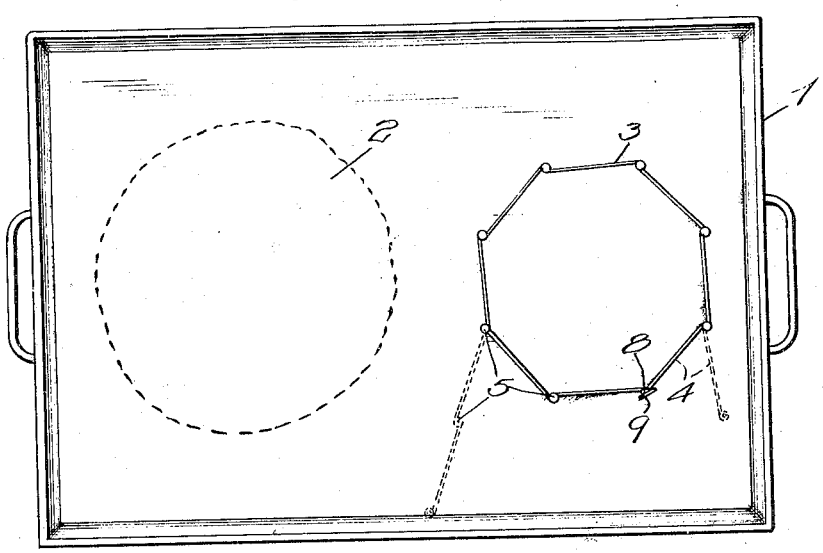
Figure 1 is a plan view showing the device in a roasting pan in conjunction with a roast.
Figure 2:
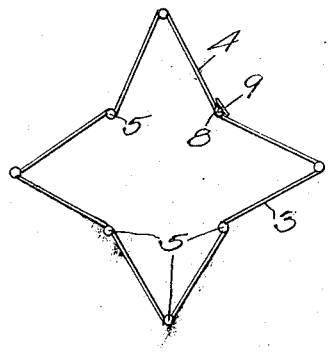
Figures 2, 3, 4 and 5 are top plan views of the device showing some of the many forms into which the device can be arranged.
Figure 3:
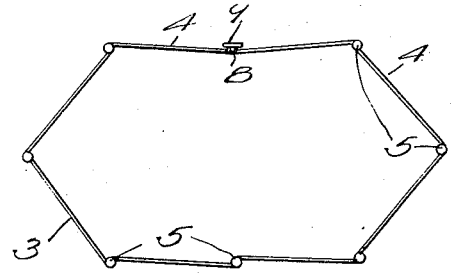
Figure 4:
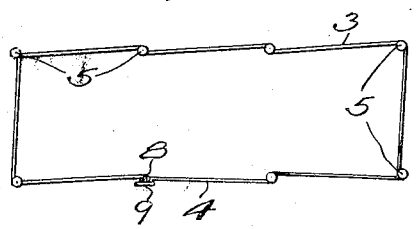
Figure 5:
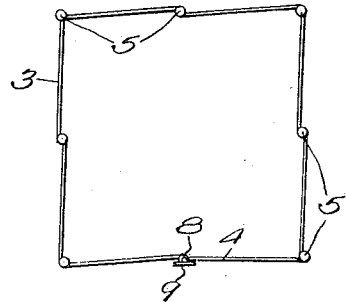

In said drawings 1 represents a roasting pan adapted to contain a roast 2 and one of my variable walls 3. My novel device consists of a plurality of panels 4 which are flat and preferably made of thin sheet metal. They are rectangular in shape and preferably all of the panels which make up the device are exactly alike in shape and form. Each of these panels, as shown in the drawings is substantially square and they are formed to be hinged together at their adjacent ends by hinge pins 5. Each panel has a pair of hinge tubes 6 at one end and a single central tube 7 at the opposite end. All of the hinge pins 5 except one thereof are permanently secured in position such as by slightly riveting the ends of the pins and I arrange one pin 8 to be readily removed providing it with a flat looped handle 9 for this purpose and also to retain it in position when connecting the two separable ends 10 and 11, of the device.

I make the pin 8 removable for the purpose of disconnecting the device so that it can be readily taken off or removed from a finished meat loaf or other roasted or baked material, as shown in dotted lines in Figure 1.

Another advantage of making one of the hinge pins removable is to permit the device to be folded into a compact form as shown in Figures 9 and 11, the hinged joints connecting the several panels permitting them to be folded down alternately into a stack for storage and shipping purposes.

As illustrated in Figures 2 to 6 inclusive, it will readily be seen that the device is capable of being used to enclose spaces of various shapes and areas and as shown in Figure 6, several of the panels can be folded together to reduce the number of panels enclosing the space and thus reduce the area of the enclosed space.

It will readily be understood that I have not illustrated all of the forms into which the device can be arranged and that it could be arranged in an irregular form to fit in an irregular space in a roasting pan as well as in one of the regular or geometric forms illustrated.

As many modifications of my invention will readily suggest themselves to one skilled in the art, I do not limit or confine my invention to the specific details of construction herein shown and described.

I claim:

A device for use in a roasting pan for enclosing a space therein and comprising a plurality of flat plates hinged together in a series to form a continuous wall adapted to be placed on edge in a roasting pan, and said wall being capable of being disconnected at one point in its length as and for the purpose specified.

Signed at Chicago, Illinois, this 11th day of April, 1922.

CLARENCE E. SLYE.